United States Patent
Burton et al.

(10) Patent No.: US 9,145,764 B2
(45) Date of Patent: Sep. 29, 2015

(54) PASS-THROUGH BULKHEAD CONNECTION SWITCH FOR A PERFORATING GUN

(71) Applicant: International Strategic Alliance, LC, Woods Cross, UT (US)

(72) Inventors: Robert Lane Burton, Woods Cross, UT (US); Brandon Lane Burton, Kayesville, UT (US); Thomas Robert Wilenski, Ogden, UT (US)

(73) Assignee: International Strategic Alliance, LC, Woods Cross, UT (US)

( * ) Notice: Subject to any disclaimer, the term of this patent is extended or adjusted under 35 U.S.C. 154(b) by 208 days.

(21) Appl. No.: 13/679,122

(22) Filed: Nov. 16, 2012

(65) Prior Publication Data

US 2013/0126237 A1 May 23, 2013

Related U.S. Application Data (60) Provisional application No. 61/562,844, filed on Nov. 22, 2011.

(51) Int. Cl.
*E21B 43/1185* (2006.01)
*H02G 9/00* (2006.01)

(52) U.S. Cl.
CPC .............. *E21B 43/1185* (2013.01); *H02G 9/00* (2013.01)

(58) Field of Classification Search
USPC ......... 166/297, 298, 55, 55.1; 175/4.54, 4.55; 89/1.1
See application file for complete search history.

(56) References Cited

U.S. PATENT DOCUMENTS

| | | | |
|---|---|---|---|
| 3,758,731 A * | 9/1973 | Vann et al. | 200/61.69 |
| 4,773,299 A | 9/1988 | Oestreich et al. | |
| 4,778,009 A * | 10/1988 | Sumner et al. | 166/55.1 |
| 5,203,723 A | 4/1993 | Ritter | |
| 5,505,134 A | 4/1996 | Brooks | |
| 5,911,277 A * | 6/1999 | Hromas et al. | 166/297 |
| 6,095,247 A | 8/2000 | Streich et al. | |
| 6,095,258 A | 8/2000 | Reese et al. | |
| 7,902,469 B2 * | 3/2011 | Hurst | 200/81 R |
| 8,695,506 B2 * | 4/2014 | Lanclos | 102/206 |
| 8,710,385 B2 | 4/2014 | Sickels | |
| 2006/0189208 A1 | 8/2006 | Shaikh | |
| 2013/0291751 A1 | 11/2013 | Sickels | |

FOREIGN PATENT DOCUMENTS

WO 2013/078116 5/2013

OTHER PUBLICATIONS

International Search Report for PCT/US2012/065803 Dated Feb. 6, 2013.
Written Opinion for PCT/US2012/065803 Dated Feb. 6, 2013.

* cited by examiner

*Primary Examiner* — William P Neuder
(74) *Attorney, Agent, or Firm* — Workman Nydegger (57) ABSTRACT

Embodiments of the present invention relate to systems, methods, and apparatus for reliably communicating a detonation signal and perforating oil and/or gas well casings. Particularly, at least one embodiment includes a pass-through bulkhead connection switch that can reliably withstand high operating temperatures and pressures. Such pass-through bulkhead connection switch can be used in perforating gun assemblies and can eliminate or reduce incidents of failed detonations.

22 Claims, 6 Drawing Sheets

PASS-THROUGH BULKHEAD CONNECTION SWITCH FOR A PERFORATING GUN

CROSS-REFERENCE TO RELATED APPLICATIONS

The present application claims the benefit of and priority to U.S. Provisional Application No. 61/562,844, entitled "Container or Housing for the Transfer of Energy Within a Material Without Any Motion of the Material as a Whole," filed on Nov. 22, 2011, the entirety of which is incorporated herein by this reference.

BACKGROUND OF THE INVENTION

1. The Field of the Invention

This invention relates to systems, methods, and apparatus for communicating detonation and control signals in a perforating gun assembly.

2. Background and Relevant Art

During oil or gas extraction operations, a well casing, including the surrounding cement layers, can be perforated to access particular areas or zones of oil and/or gas deposits. Particularly, such perforations can create flow conduits, which can channel oil and gas from the deposit areas into the well. In some instances, a hydraulic fluid can be pumped into the well and through the perforations to produce fracking (or hydraulic fracturing) in the surrounding rock layers, which can facilitate increased flow of oil and/or gas into the well.

Commonly, the perforations are made with a perforating gun (or a perforating gun assembly) that is loaded with explosive charges (e.g., shape charges). Such perforating gun can have multiple charges positioned about the circumference thereof. Accordingly, as the perforating gun fires or detonates the charges, resulting blasts can create perforations at multiple locations about the circumference of the well casing.

A perforating string incorporating a single or multiple perforating guns can be lowered into the well and the perforating guns can be positioned at desired depths. Subsequently, a detonation signal from a detonation controller (typically located at ground level) can be sent to the perforating gun, detonating the charges in a desired sequence. For instance, the perforating string may contain two perforating guns, and the lower perforating gun may be fired first, while the upper perforating gun can be fired thereafter.

Commonly, zones that contain desirable amounts of oil and/or gas deposits can be relatively thin but numerous. Such zones can be separated from each other by nonproductive sections. Hence, using a perforating string with multiple perforating guns can be a most efficient procedure for accessing the oil and gas deposits near the well. Moreover, to access the oil and/or gas deposits, the multiple perforating guns can be selectively fired, to perforate the well casing adjacent the desired zones.

In some instances, the signal from the surface passes through a connection switch and triggers a detonator. The detonator can then ignite a detonating cord (e.g., Primacord), which can, in turn, detonate the explosive charges of the perforating gun. Commonly, connection switches, which pass the signal from the surface to the detonator, have various moving, mechanical components. Such mechanical components can increase the risk of failure of the connection switch. For example, connection switches can be subjected to high pressures (e.g., static pressure within the well and increased pressure from a blast wave created after detonation of the explosive charges) and high temperatures.

If a connection switch fails, usually the entire perforating string, including all of the perforating guns, is withdrawn out of the well to remedy the failure. Because some of the perforating guns may contain undetonated explosive charges extreme precautions typically must be taken to avoid surface detonation. Furthermore, usually, to replace the failed connection switches, the perforating guns are disassembled, which can be dangerous, time consuming, and expensive.

Accordingly, there are a number of disadvantages in devices, systems, and methods for communicating detonation signals in perforating gun assemblies that can be addressed.

BRIEF SUMMARY OF THE INVENTION

Embodiments of the present invention provide systems, methods, and apparatus for reliably communicating a detonation signal or command and perforating oil and/or gas well casings. Particularly, at least one embodiment includes a pass-through bulkhead connection switch that can reliably withstand high operating temperatures and pressures. Such pass-through bulkhead connection switch can be used in perforating gun assemblies and can eliminate or reduce incidents of failed detonations. Accordingly, the pass-through bulkhead connection switch can lead to reduced accidents during oil and gas drilling and/or exploration costs. Furthermore, reduction or elimination of failed detonations also can reduce or eliminate the need for withdrawing the perforating gun assemblies from the well before completing well perforations. Consequently, the reliable pass-through bulkhead connection switch can reduce instances of surface detonation, which also can improve worker safety.

One embodiment can include a pass-through bulkhead connection switch that has no moving parts. The pass-through bulkhead connection switch is configured to provide a reliable connection for transmitting a detonation signal from a detonation controller located at ground level to a detonation mechanism of a perforating gun assembly configured to be positioned in a well and utilized for perforating a well casing. The pass-through bulkhead connection switch can include an insulating body comprising insulating material. Furthermore, such insulating material can be noncorrosive and/or acid resistant. The insulating body can be sized and configured to be secured within an opening of an isolation subassembly of the perforating gun assembly. Furthermore, the insulating body can have at least one O-ring grove in an outer surface thereof. The insulating body also can have an aperture passing therethrough. The pass-through bulkhead connection switch can further include a conductive pin that may have a front portion, a back portion, and a center portion that can be larger or smaller than one or more of the front portion and the back portion. The center portion of the conductive pin also can be secured within the aperture of the insulating body. Moreover, the conductive pin can be configured to transmit the detonation signal to the perforating gun assembly located in the well.

Another embodiment can include a system for making perforations in a well casing at multiple depth locations in a sequential manner. In other words, multiple perforating gun assemblies can be selectively fired (in a particular sequence or without any particular sequence). Such perforations can be configured to access one or more of oil and gas deposits disposed within a rock layer below ground and to channel the same into the well. The system can include a first perforating gun assembly that can have a first plurality of charges and a first detonation mechanism configured to detonate the first plurality of charges. The system also can incorporate a second perforating gun assembly that can have a second plurality of charges, an isolation subassembly, and a second detonation mechanism located in the isolation subassembly. The second detonation mechanism can be configured to detonate the second plurality of charges. Additionally, the system can include a pass-through bulkhead connection switch in electrical communication with the first detonation mechanism and with the second detonation mechanism. The pass-through bulkhead connection switch can be configured to communicate a detonation signal to the first detonation mechanism. The pass-through bulkhead connection switch can be further configured to prevent or reduce increase of pressure about the second detonation mechanism from a blast wave formed after the detonation of the first plurality of charges.

Additional embodiments can include a method of reliably, sequentially or non-sequentially transmitting detonation signals to detonation mechanisms of multiple perforating gun assemblies and detonating explosive charges housed in the perforating gun assemblies. Such method can include isolating a first detonation mechanism in a first isolation chamber of a first perforating gun assembly by sealing the first isolation chamber with a pass-through bulkhead connection switch. The first detonation mechanism can be in electrical communication with the pass-through bulkhead connection switch, and the pass-through bulkhead connection switch can be in electrical communication with a second detonation mechanism. The method also can include detonating a second plurality of charges located in a second perforating gun assembly by sending a detonation signal through the pass-through bulkhead connection switch to the second detonation mechanism. Furthermore, the pass-through bulkhead connection switch can be configured to at least partially block a blast wave generated by the detonation of the second plurality of charges.

Additional features and advantages of exemplary embodiments of the invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Embodiments of the present invention provide systems, methods, and apparatus for reliably communicating a detonation signal or command and perforating oil and/or gas well casings. Particularly, at least one embodiment includes a pass-through bulkhead connection switch that can reliably withstand high operating temperatures and pressures. Such pass-through bulkhead connection switch can be used in perforating gun assemblies and can eliminate or reduce incidents of failed detonations. Accordingly, the pass-through bulkhead connection switch can lead to reduced accidents during oil and gas drilling and/or exploration costs. Furthermore, reduction or elimination of failed detonations also can reduce or eliminate the need for withdrawing the perforating gun assemblies from the well before completing well perforations. Consequently, the reliable pass-through bulkhead connection switch can reduce instances of surface detonation, which also can improve worker safety.

The pass-through bulkhead connection switch also can provide a reliable isolation and insulation for the detonation signal sent from a detonation controller located at ground level to the perforating gun assembly (e.g., to a detonation mechanism). More specifically, the pass-through bulkhead connection switch can facilitate transmission of the detonation signal in a harsh environment, such as a high temperatures and pressures, as described below. Moreover, the pass-through bulkhead connection switch can reduce instances of short-circuited connections, such as short circuits that can occur between an isolation subassembly of the perforating gun assembly and the pass-through bulkhead connection switch. Thus, the pass-through bulkhead connection switch can reduce or eliminate detonation failures associated with such short circuits.

In some embodiments, the pass-through bulkhead connection switch can comprise an insulating portion and an electrically conductive portion. The electrically conductive portion of the pass-through bulkhead connection switch can transmit the detonation signal from the detonation controller to the detonation mechanism of the perforating gun assembly. Furthermore, as the detonation signal is transmitted through the conductive portion of the pass-through bulkhead connection switch, the insulating portion of the pass-through bulkhead connection switch can prevent short-circuiting the detonation signal, for instance, on metallic components of the perforating gun assembly. Moreover, the insulating portion of the pass-through bulkhead connection switch can reduce or prevent RF interference with the detonation signal.

In some instances, a perforating string can incorporate multiple perforating gun assemblies, which can perforate different sections of the well casing. Also, the perforating gun assemblies can fire or detonate in a predetermined detonation sequence. For example, the detonation sequence can start with the lowest perforating gun assembly and can proceed in an upward direction, sequentially. In some embodiments, the pass-through bulkhead connection switch can isolate at least one chamber of the perforating gun assembly, thereby preventing a rapid increase in pressure therein, which can result from a blast wave created after the detonation of the charges. Accordingly, as one perforating gun assembly fires, components of the subsequent perforating guns assemblies can remain unaffected and/or undamaged by the blast wave. In other words, the pass-through bulkhead connection switch can prevent propagation of the blast wave from the explosion into isolated chambers of unfired perforating gun assemblies.

Consequently, the pass-through bulkhead connection switch can facilitate safe and reliable sequential or non-sequential detonation of the charges. More specifically, as noted above, failure to detonate can be expensive and dangerous, as such failure may require the ground crew to withdraw the perforating string from the well and disassemble and reassemble the perforating string. Thus, preventing damage to and/or failure of various components (e.g., detonation mechanism) of the unfired perforating gun assemblies, which may result from a sudden increase of pressure caused by the blast wave, can lead to safer and more reliable detonations. Additionally, as noted above, the pass-through bulkhead connection switch can at least partially block triggering signals from surrounding RF sources, which also can increase reliability of detonations.

Figure 1A:
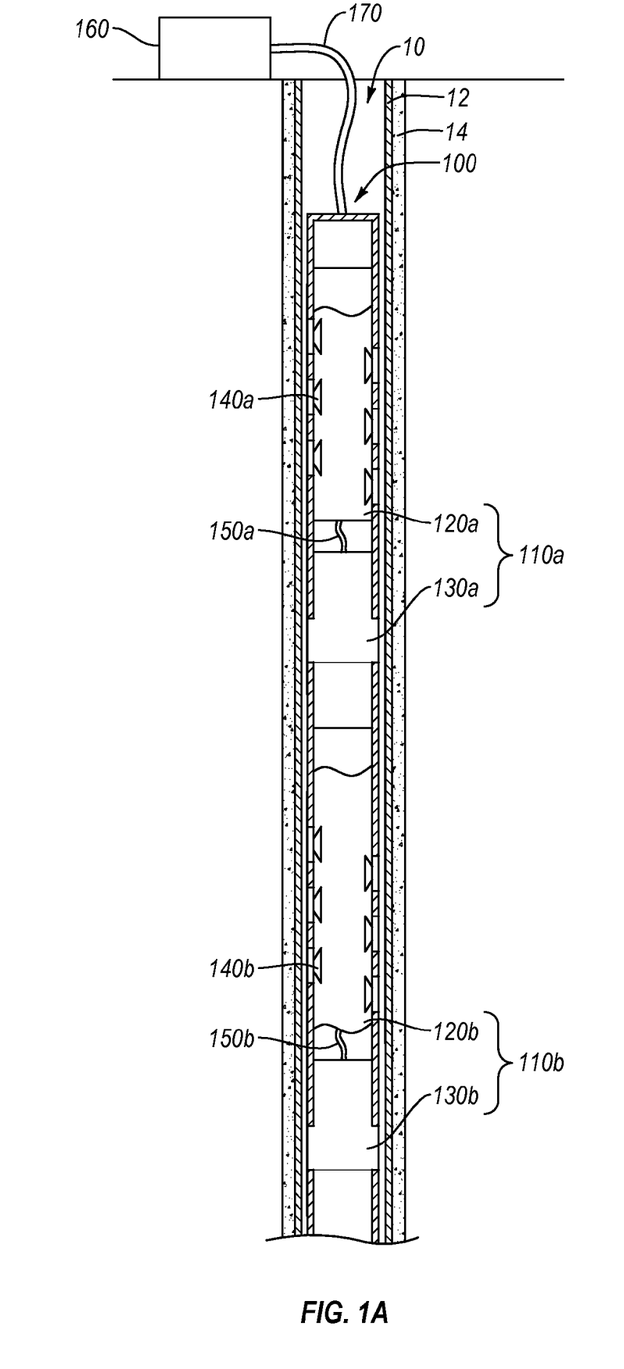
FIG. 1A illustrates a cross-sectional schematic view of a perforating string in a well in accordance with one embodiment of the present invention.

Referring now to the Figures, FIG. 1A illustrates a perforating string 100 lowered into a well 10, for creating perforations in a well casing 12. The perforating string 100 can have a single or multiple perforating gun assemblies, such as perforating gun assemblies 110a, 110b. The perforating gun assembly 110a can be the same as or similar to the perforating gun assembly 110b. Thus, references to and description of the perforating gun assembly 110a and/or any components thereof is equally applicable to the perforating gun assembly 110b, and vice versa.

As noted above, the perforating gun assembly 110a can be located along the length of the perforating string 100. Particularly, as the perforating string 100 is lowered into the well 10, the perforating gun assemblies 110a, 110b can be positioned at locations of gas and/or oil deposits, such that perforations through the well casing can allow the gas and/or oil to flow into the well.

In some embodiments, the perforating gun assemblies 110a, 110b can include respective charge carriers 120a, 120b and isolation subassemblies 130a, 130b. The charge carriers 120a, 120b can hold multiple charges 140a, 140b (e.g., shape charges) that, after detonation, can perforate the well casing 12 and a surrounding cement layer 14. In light of this disclosure, those skilled in the art should appreciate that the charges 140a, 140b can have any suitable arrangement on or in the charge carriers 120a, 120b, which can vary from one embodiment to the next.

As described below in greater detail, the isolation subassemblies 130a, 130b can house various components, including the detonation mechanism, which can trigger detonation of the charges 140a, 140b. For instance, the detonation mechanisms of the isolation subassemblies 130a, 130b can ignite detonating cords 150a, 150b, which can trigger the detonation of the charges 140a, 140b. Furthermore, the detonation mechanism of the perforating gun assembly 110a can be in electrical communication with the perforating gun assembly 110b, which can be located at a lower position along the perforating string 100. Hence, the detonation signal can be sent first to the perforating gun assembly 110b and can, subsequently, proceed from the perforating gun assembly 110b to the perforating gun assembly 110a. In other words, the perforating gun assembly 110b can fire first, and the perforating gun assembly 110a can fire thereafter.

To fire the perforating gun assemblies 110a and/or 110b, the perforating string 100 can be connected to a detonation controller 160. For instance, a cable 170 can connect the perforating gun assemblies 110a, 100b to the detonation controller 160. The detonation controller 160 can send the detonation signal down the cable 170 to the perforating gun assemblies 110a, 110b (i.e., to the detonation mechanisms thereof). In some instance, the detonation signal can be a pulse or series of pulses of alternating or direct current having predetermined frequency (or frequencies and addresses). For example, the perforating gun assembly 110b can be triggered by a first pulse (having a first frequency) and the perforating gun assembly 110a can be triggered by a second pulse (having a second frequency). Hence, the detonation controller 160 can stagger and sequence firings of the perforation gun assemblies 110a, 110b in a predetermined manner.

Figure 1B:
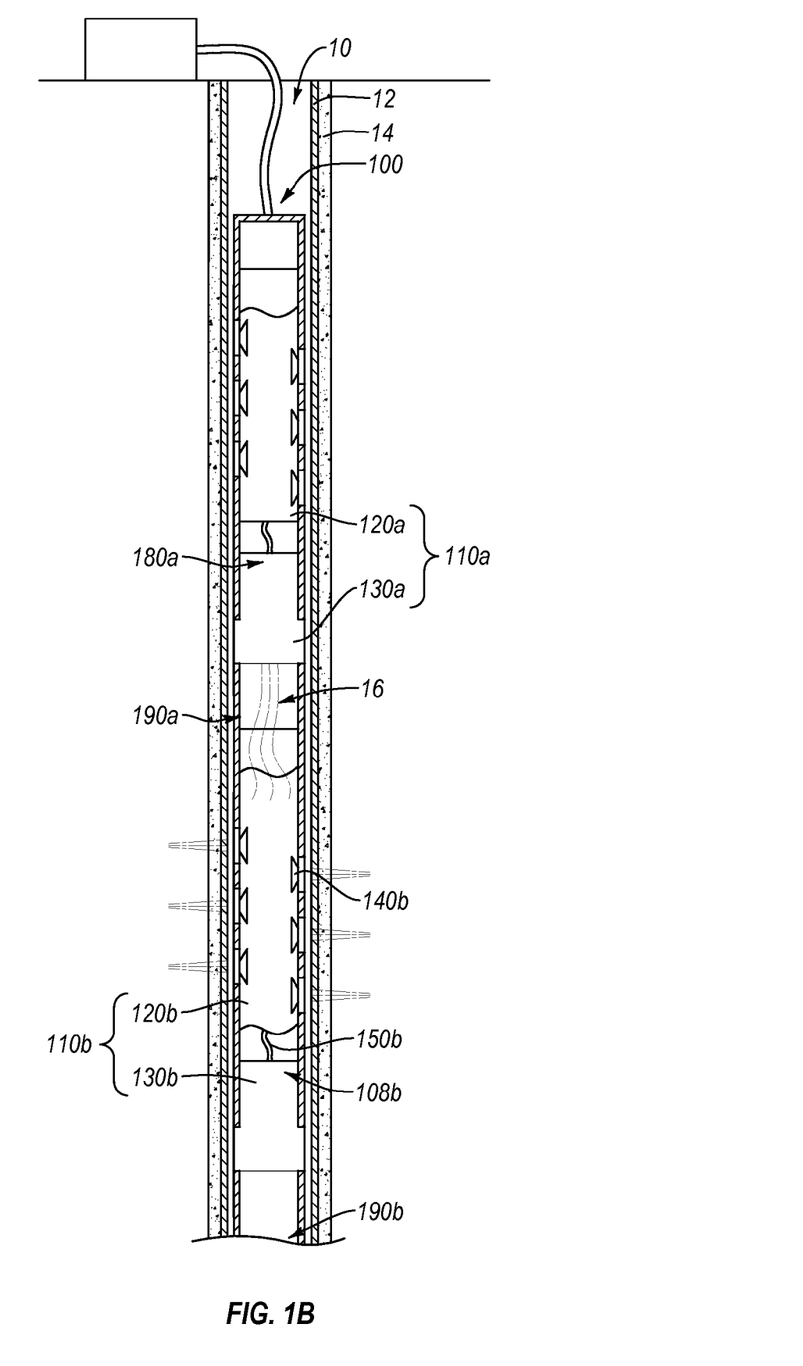
FIG. 1B illustrates a cross-sectional schematic view of firing of a first perforating gun assembly in a perforating string in accordance with one embodiment of the present invention.

Furthermore, the isolation subassemblies 130a, 130b can at least partially isolate (or insulate) various components of the respective perforating gun assemblies 110a, 110b from a blast wave created during the firing of the other perforating gun assembly. For example, as illustrated in FIG. 1B, the second perforating gun assembly 110b can detonate the charges 140b located in the charge carrier 120b. Particularly, the detonation mechanism located in the isolation subassembly 130b can ignite the detonating cord 150b, which can detonate the charges 140b.

Such detonation of the charges 140b can perforate the well casing 12 and the surrounding cement layer 14 of the well 10. In addition to or in lieu of perforating the well casing 12, detonation of the charges 140b can create a blast wave 16 (i.e., a pressure wave), which can propagate within the perforating string 100. The localized pressure created by the blast wave 16 can be up to 30,000 psi per second or 20 Tera psi per nanosecond. Furthermore, the blast wave 16 also can create an increase in temperature of the surrounding air (and/or other gases), which can travel together with the blast wave 16.

In some embodiments, the detonation mechanisms can be located in respective upper portions 180a, 180b of the isolation subassemblies 130a, 130b. The detonation mechanism housed in the isolation subassembly 130a can be damaged by the increased pressure caused by the blast wave 16 and/or by increased temperature that may be caused by heated air and gases traveling with the blast wave 16. As noted above, damage to the detonation mechanism of the perforating gun assembly 110a can lead to unintended firing outside of the intended pay zones or to the failure of the perforating gun assembly 110a to fire.

In some instances, the blast wave 16 can enter a lower portion 190a of the isolation subassembly 130a. To prevent or minimize damage to the detonation mechanism located in the upper portion 180a of the isolation subassembly 130a, the isolation subassembly 130a can block or impede propagation of the blast wave 16 from the lower portion 190a to the upper portion 180a thereof, as described below in greater detail. Consequently, blocking or impeding propagation of the blast wave 16 can reduce or eliminate increase in pressure and/or temperature in the environment surrounding the detonation mechanism, which can lead to reduction or elimination of detonation failures caused by damage to the components (e.g., detonation mechanism) of the unfired perforating gun assembly 110a.

Figure 2:
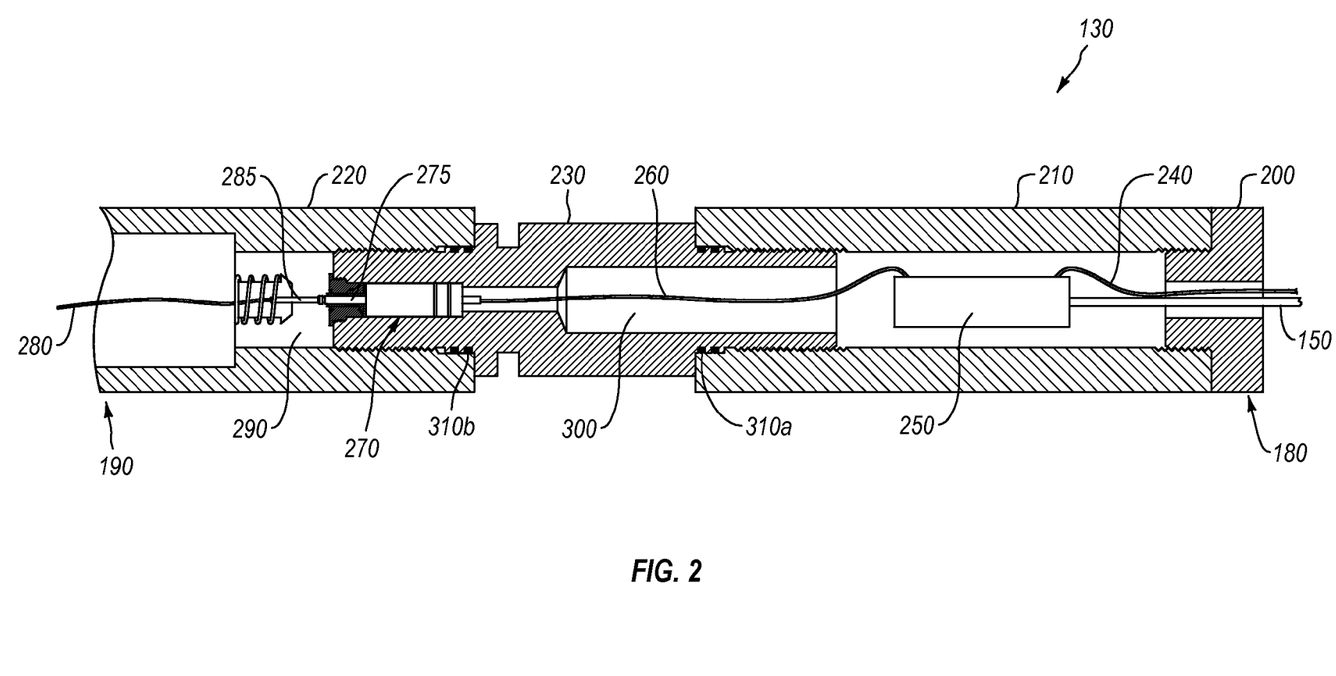
FIG. 2 illustrates a section view of an isolation subassembly in accordance with one embodiment of the present invention.

FIG. 2 illustrates an exemplary embodiment of an isolation subassembly 130, which can block or impede propagation of the blast wave from a lower portion 190 to an upper portion 180 thereof. Particularly, the upper portion 180 can comprise a cap 200 that can couple to a main sub body 210. Opposite to the upper portion 180, the lower portion 190 can comprise a lower gun assembly 220. The lower gun assembly 220 can couple to a first end of a middle section 230. On a second end (opposite to the first end), the middle section 230 can couple to the main body 210. In at least one embodiment, the various components of the isolation subassembly 130 can couple have threaded connections.

A detonating cord 150 can exit the cap 200 and can connect to the charges (as illustrated in FIGS. 1A-1B). Additionally, a first wire 240 can pass through the cap 200 and can connect to the detonation mechanism, such as a switch/detonator 250. For instance, the switch/detonator 250 can be a combination of a switching device (e.g., a Selectronic switch from DYNAenergetics) and a detonator. Hence, the switch/detonator 250 can receive the detonation signal from the detonation controller and can cause the detonator to ignite the detonating cord 150. As mentioned above (and further described below), the switch/detonator 250 can be located in the upper portion 180 of the isolation subassembly 130. It should be noted that those skilled in the art should appreciate that the wires in the perforating gun assemblies can have a conductive portion or core, which can be surrounded by or encased in insulating material.

The detonation signal can be sent from the detonation controller over the first wire 240. As described above, multiple perforating gun assemblies can be controlled and fired in a single deployment. In some instance, the detonation signal can be transmitted from the switch/detonator 250 through a second wire 260, which can be in electrical communication with the detonation mechanism of the subsequent perforating gun assembly. Furthermore, the switch/detonator 250 can be configured to fire any perforating gun assembly or multiple perforating gun assemblies in any desired sequence.

In one or more embodiments, the second wire 260 can be connected to a pass-through bulkhead connection switch 270. The pass-through bulkhead connection switch 270 can be located in the middle section 230. Specifically, the pass-through bulkhead connection switch 270 can be secured within an opening in the middle section 230. The pass-through bulkhead connection switch 270 can connect the second wire 260 to a third wire 280. The third wire 280 can be connected to the detonation mechanism of the subsequent perforating gun assembly. Accordingly, the detonation signal can proceed from the switch/detonator 250 down the second wire 260, through the pass-through bulkhead connection switch 270, and down the third wire 280 to the detonation mechanism of the subsequent perforating gun assembly.

Particularly, the second wire 260 can be connected to a conductive pin 275 of the pass-through bulkhead connection switch 270, as further described below. The third wire 280 can be connected to a second conductive pin 285. When the middle section 230 is coupled to the lower gun assembly 220, the conductive pin 275 can be in contact with the second conductive pin 285, thereby connecting the second wire 260 to the third wire 280. In other words, the pass-through bulkhead connection switch 270 can be in electrical connection with the second conductive pin 285, which together, can connect the second wire 260 to the third wire 280. Thus, the detonation signal can travel along the second wire 260 to the third wire 280.

As can be seen, the isolation subassembly 130 can have two isolation chambers: a first isolation chamber 290 and a second isolation chamber 300. In one or more embodiments, the pass-through bulkhead connection switch 270 can seal the first isolation chamber 290 from the second isolation chamber 300, such that the pressure produced within the first isolation chamber 290 cannot be communicated to the second isolation chamber 300 and vice versa. Additionally, to seal and isolate the first isolation chamber 290 and second isolation chamber 300 from each other, the isolation subassembly 130 can incorporate O-rings 340a, 340b. Particularly, the O-rings 340a, 340b can create a pressure seal between the second end of the middle section 230 and the main sub body 210 and between a first end of the middle section 230 and the lower gun assembly 220. Hence, the second end of the middle section 230 and the main sub body 210 can define the first isolation chamber 290, which can be sealed and isolated from the second isolation chamber 300 by the O-rings 340a and by the pass-through bulkhead connection switch 270.

In light of this disclosure, those skilled in the art should appreciate that the first and second isolation chambers 290, 300 can be sealed (e.g., via O-rings 340a) from gases, liquids, slurries, and the like. For example, in some instances, liquid (e.g., mud) can be pumped into the well, which can create hydrostatic pressure of about 15,000 psi at the location of the perforating gun assembly. Hence, in at least one embodiment, the first and second isolation chambers 290, 300 can be sealed from liquid leaks, which may otherwise result from the pressurized liquid surrounding the perforating gun assembly and the isolation subassembly 130.

As noted above, the switch/detonator 250 can be isolated (or insulated) from the blast wave and, thus, protected from localized pressure and/or temperature increases, which can damage or destroy the switch/detonator 250. More specifically, the switch/detonator 250 can be located in the second isolation chamber 300. Accordingly, the switch/detonator 250 can be at least partially insulated from the pressure and temperature increases that can occur within the first isolation chamber 290.

In some instances, there may be an imperfect seal between the first isolation chamber 290 and second isolation chamber 300. Thus, over time, the pressure across the first isolation chamber 290 and second isolation chamber 300 may equalize. However, a sudden and substantial increase in pressure within one of the first isolation chamber 290 may not produce an equally sudden and substantial increase within the second isolation chamber 300, and vice versa.

For example, the blast wave can create a sudden and substantial increase in pressure in the first isolation chamber 290. The pass-through bulkhead connection switch 270, however, can prevent the blast wave from propagating from the first isolation chamber 290 into the second isolation chamber 300. Furthermore, as noted above, the pass-through bulkhead connection switch 270 can provide electrical connection between the second wire 260 (located in the first isolation chamber 290) and the third wire 280 (located in the second isolation chamber 300). Accordingly, the pass-through bulkhead connection switch 270 can protect components (e.g., the switch/detonator 250) of the perforating string located in the second isolation chamber 300 from damage and/or destruction that may be caused by a blast wave in the first isolation chamber 290. At the same time, the pass-through bulkhead connection switch 270 can communicate the detonation signal to subsequent perforating gun assemblies.

Figure 3:
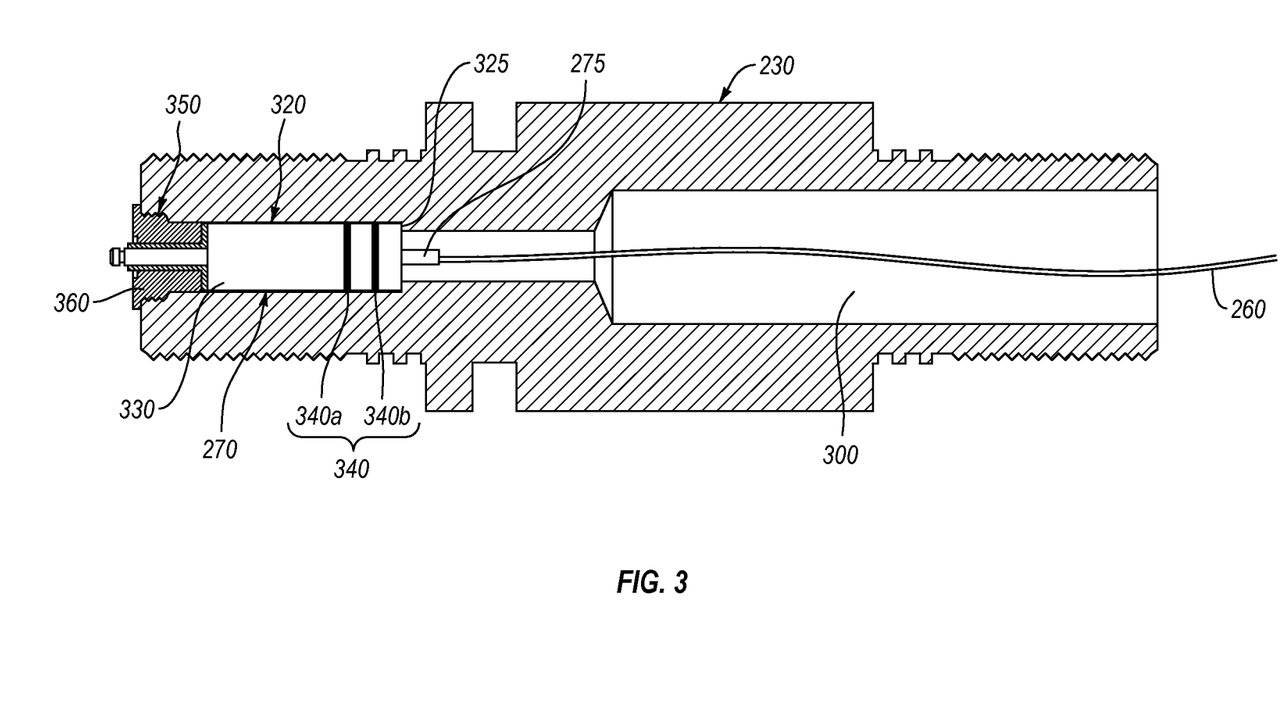
FIG. 3 illustrates a cross-sectional view of a middle section of an isolation subassembly in accordance with one embodiment of the present invention.

In any event, the pass-through bulkhead connection switch 270 can be secured within the middle section 230 and can seal the first isolation chamber 290 in any number of suitable ways, which can vary from one embodiment to another. For example, as illustrated in FIG. 3, the middle section 230 can have an opening 320 that can accommodate the pass-through bulkhead connection switch 270 therein. Particularly, the opening 320 can have a shoulder 325 that can support the pass-through bulkhead connection switch 270 within the opening 320. The shoulder 325 also can at least partially prevent movement of the pass-through bulkhead connection switch 270 within the opening 320.

Furthermore, internal dimensions of the opening 320 can be substantially the same as the external dimensions of the pass-through bulkhead connection switch 270. For example, the pass-through bulkhead connection switch 270 can have an insulating body 330, which can have a substantially cylindrical shape. The opening 320 also can have a substantially cylindrical shape that can accommodate the insulating body 330 therein. Hence, the internal diameter (I.D.) of the opening 320 can be substantially the same as the outside diameter (O.D.) of the insulating body 330. Accordingly, in at least one embodiment, the insulating body 330 can be press fitted into the opening 320.

In some embodiments, the insulating body 330 can comprise a thermoplastic material, such as Polyetheretherketone, an elastomeric material, a composite material, as well as other suitable insulating materials, and combinations thereof, which can have the desired physical properties (e.g., resistivity, strength, etc.). Additionally or alternatively, the insulating body 330 can incorporate various fillers into the thermoplastic material (e.g., glass, carbon fiber, etc.), which can increase the structural strength and/or impact properties in addition to thermal durability and dimensional stability of the insulating body 330. Hence, the material comprising the insulating body 330 can be configured to withstand the localized pressure and temperature created by the blast wave.

For example, the insulating body 330 can comprise material that can be thermally stable at operating temperatures of up to about 480° F. Also, in at least one embodiment, the material comprising the insulating body 330 can withstand static operating pressure of up to or in excess of 30,000 psi. For instance, the insulating body 330 can withstand pressure in the ranges of about 14,000 psi to 16,000 psi, 15,000 psi to 18,000 psi, 17,000 psi to 20,000 psi, 19,000 psi to 25,000 psi, and 24,000 psi to 30,000 psi. In some embodiments, the insulating body 330 can comprise KETASPIRE material available from SOLVAY.

In one or more embodiments, a portion of the insulating body 330 can have a 0.750" O.D. with a tolerance of +0.0005". The opening 320 can have a 0.750" I.D. with a tolerance of −0.0005". Consequently, the insulating body 330 can be press fitted into the opening 320.

Alternatively, the insulating body 330 can have a slip fit within the opening 320. For example, a portion of the insulating body 330 can have a 0.750" O.D. with a tolerance of ±0.001". The opening 320 can have a 0.745" I.D. with a tolerance of ±0.001. Thus, the insulating body 330 can slide into the opening 320. It should be appreciated that particular size and shape of the pass-through bulkhead connection switch 270 and/or a portion thereof that can fit into the opening 320, such as the insulating body 330, can vary from one embodiment to another.

Likewise, the size and shape of the opening 320 also can vary from one embodiment to the next, in a manner that allows the pass-through bulkhead connection switch 270 to fit into the opening 320. Moreover, as noted above, the pass-through bulkhead connection switch 270 (or the insulating body 330) can have either a slip fit or press fit within the opening 320. As such, tolerances of the opening 320 and of the insulating body 330 also can be chosen based on the desired clearance or interference between the opening 320 and the insulating body 330.

In at least one embodiment, the pass-through bulkhead connection switch 270 can include one or more O-rings 340 (e.g., O-rings 340a, 340b). As described above, the pass-through bulkhead connection switch 270 can prevent the blast wave from propagating from the first isolation chamber 290 to the second isolation chamber 300 (FIG. 2). Hence, in some embodiments the O-rings 340 can create a sufficient seal between the first isolation chamber 290 and the second isolation chamber 300, which can stop or impede propagation of the blast wave. For instance, when the pass-through bulkhead connection switch 270 is inserted into opening 320, the opening 320 can compress the O-rings 340, thereby providing a seal between the opening 320 and the insulating body 330.

As further described below, the O-rings 340 can be located on and/or secured to the insulating body 330. As such, the insulating body 330 and the O-rings 340 can seal the opening 320 and can prevent the propagation of the blast wave between the first isolation chamber 290 and the second isolation chamber 300. Additionally or alternatively, the interference fit between the opening 320 and the insulating body 330 also can stop or impede propagation of the blast wave from the first isolation chamber 290 to the second isolation chamber 300. In any event, the pass-through bulkhead connection switch 270 can protect the detonation mechanism that can be located in the second isolation chamber 300.

In some embodiments, a retention mechanism can secure the pass-through bulkhead connection switch 270 within the opening 320. For instance, the opening 320 can have an internal thread 350 at a proximal end thereof. The internal thread 350 can accept and mate with an external thread of a retention nut 360. The retention nut 360 can be screwed into the proximal end of the opening 320 and can secure the pass-through bulkhead connection switch 270 within the opening 320. Thus, the retention nut 360 can press against the insulating body 330, thereby preventing movement of the insulating body 330 in the direction of the proximal end of the opening 320. Furthermore, the retention nut 360 can press the insulating body 330 against the shoulder 325, and can restrain the insulating body 330 (and the pass-through bulkhead connection switch 270) from moving relative to the opening 320.

In at least one embodiment, the retention nut 360 can be at least partially insulated. For example, an opening in the retention nut 360 that provides access to the conductive pin 275 can be insulated. Accordingly, such insulation can reduce the likelihood of short-circuiting the conductive pin 275 on the retention nut 360. Additionally or alternatively, the retention nut 360 can comprise insulating material, which can withstand the pressure and/or temperature produced around the retention nut 360 by the blast wave. For instance, the retention nut 360 can comprise the same or similar material as the insulating body 330.

In some embodiments, the middle section 230 can comprise a metallic material, such as steel, which can withstand the static pressure in the well and the localized pressure created by the blast wave. Hence, in at least one embodiment, the middle section 230 can be electrically conductive. As mentioned above, the pass-through bulkhead connection switch 270 can transmit the detonation signal from the switch/detonator to the next perforating gun subassembly. More specifically, the detonation signal can be transmitted from the detonation mechanism (e.g., switch/detonator), down the second wire to second wire 260, and through the pass-through bulkhead connection switch 270 to the subsequent perforating gun assembly. Since insulating body 330 is formed from an electrically insulating material, the pass-through bulkhead connection switch 270 can prevent short-circuiting the detonation signal on the middle section 230, which is commonly formed of a conductive material, such as steel. At the same time, the pass-through bulkhead connection switch 270 also can withstand the extreme pressure created by the blast wave propagating through the first isolation chamber.

As mentioned above, the second wire 260 can be connected to conductive pin 275, which can be housed and/or secured in the insulating body 330. Those skilled in the art should appreciate that the second wire 260 and the conductive pin 275 can be electrically conductive. To prevent short-circuiting the detonation signal, the insulating body 330 can have sufficient resistance and insulating properties, to prevent short-circuiting the conductive pin 275 on the middle section 230 of the isolation subassembly.

Figure 4A:
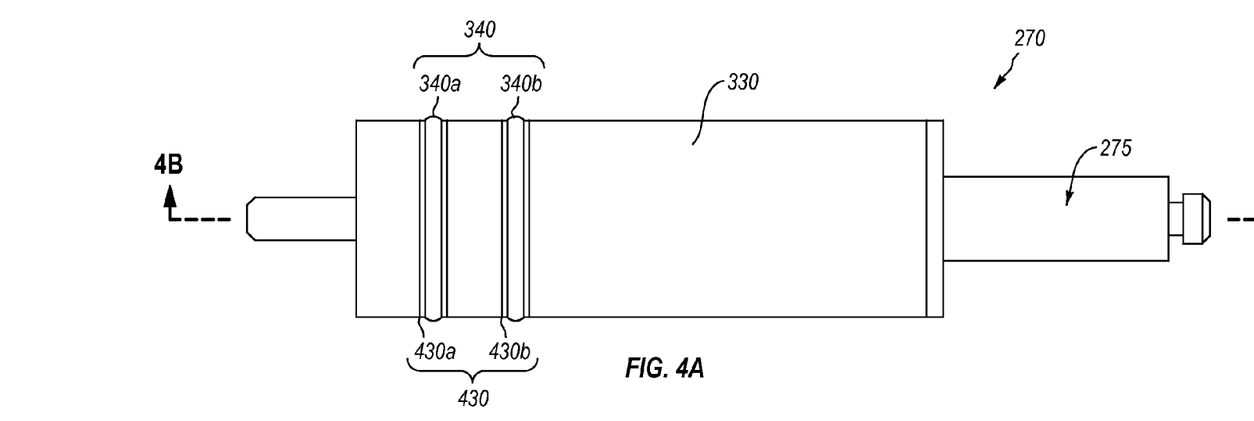
FIG. 4A illustrates a side view of a pass-through bulkhead connection switch in accordance with one embodiment of the present invention.
Figure 4B:
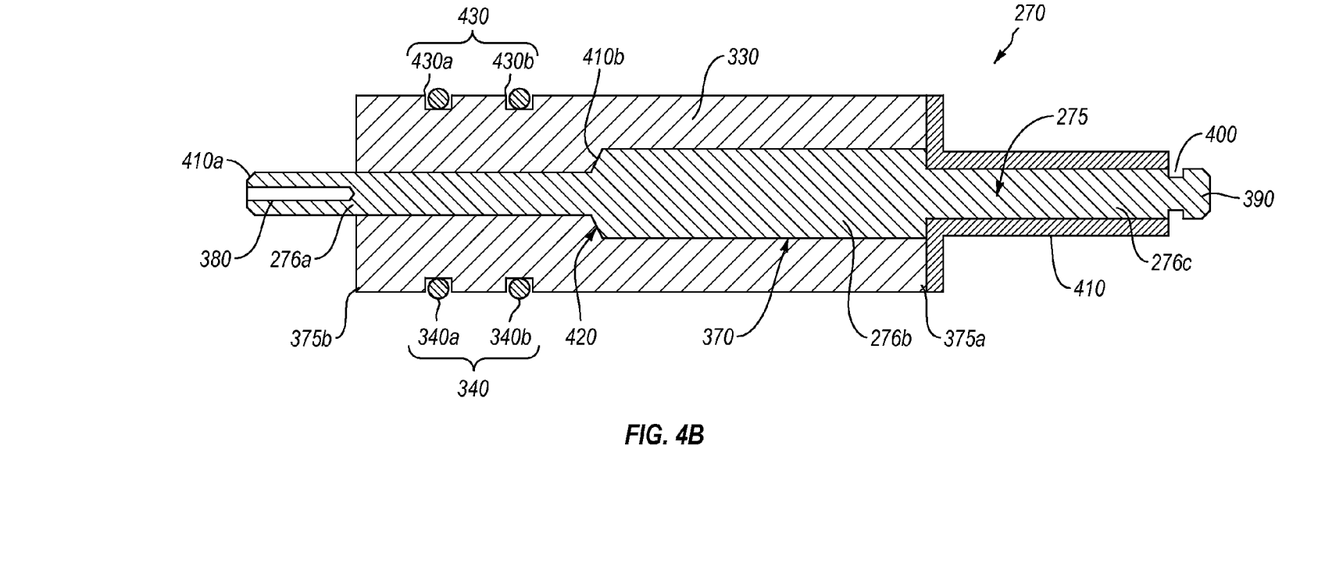
FIG. 4B illustrates a cross-sectional view of the pass-through bulkhead connection switch of FIG. 4A.

For example, as illustrated in FIGS. 4A-4B, the pass-through bulkhead connection switch 270 can incorporate the conductive pin 275 within an aperture 370 of the insulating body 330. The aperture 370 can span from a front end 375a to a back end 375b of the insulating body 330. Consequently, the insulating body 330 can insulate the portion of the conductive pin 275 located therein and can prevent short-circuiting the detonation signal on the middle section 230 of the isolation subassembly. The shape of the conductive pin 275 can vary from one embodiment to another. For instance, the conductive pin 275 can have a substantially cylindrical shape. Accordingly, the aperture 370 also can have a substantially cylindrical shape, which can accommodate the conductive pin 275 therein.

Moreover, the conductive pin 275 can have a back portion 276a, a center portion 276b, and a front portion 276c. The second wire 260 (FIGS. 2, 3) can connect to the back portion 276a of the conductive pin 275. More specifically, the conductive core of the second wire 260 can be inserted into and secured within an opening 380, located in the back portion 276a of the pass-through bulkhead connection switch 270. Additionally, in some embodiments, the conductive pin 275 can be continuous and uninterrupted. In other words, the back, center, and front portions, 276a, 276b, 276c of the conductive pin 275 can be fixedly coupled or integrated (e.g., monolithically integrated) together. Furthermore, as used herein, the term "conductive pin" is intended to refer broadly to any type of conductive path that can communicate an electrical signal (e.g., detonation signal or control command) between two components of a perforation gun assembly.

A particular mechanism utilized to secure the second wire 260 within the opening 380 can vary from one embodiment to the next. For instance, the second wire 260 can be soldered to the conductive pin 275. Additionally or alternatively, the back portion 276a can be compressed, thereby at least partially collapsing the opening 380 and securing the second wire 260 therein. In some embodiments, the second wire 260 can be fastened to the conductive pin 275 with a fastener, such as a self-tapping screw. In any event, the second wire 260 can be in electrical communication with and secured to the conductive pin 275.

The conductive pin 275 can include a contactor tip 390 located on a proximal end thereof, which can contact the second conductive pin 285 (FIG. 2), thereby creating an electrical connection between the second wire 260 and the third wire 280. The contactor tip 390 can be separated from the front portion 276c of the conductive pin 275 by a groove 400.

As described above, the pass-through bulkhead connection switch 270 can be secured within the middle section of the isolation subassembly by a retention nut 360. In some instances, the retention nut 360 can comprise a metallic material (e.g., steel), which can be conductive. Hence, the groove 400 can provide separation between the contactor tip 390 and the retention nut 360, so as to avoid short-circuiting the contactor tip 390 on the retention nut 360 and on the middle section 230 of the isolation subassembly.

To provide further protection from short-circuiting the conductive pin 275 on the retention nut 360, an insulating sleeve 410 can be fitted over the front portion 276c of the conductive pin 275. The insulating sleeve 410 can create an insulation barrier between the conductive pin 275 and the retention nut 360. In one embodiment, the insulating sleeve 410 can be press fitted over the front portion 276c of the conductive pin 275. In another optional embodiment, the insulating sleeve 410 can have a slip fit or may be loosely fitted over the front portion 276c of the conductive pin 275.

In at least one embodiment, the center portion 276b and at least a part of the back portion 276a of the conductive pin 275 can be located in the aperture 370 of the insulating body 330. It should be understood, however, that any one portion of and/or the entire conductive pin 275 can be located within the insulating body 330, which can insulate the conductive pin 275. Also, the center portion 276b of the conductive pin 275 can have greater outside dimensions (e.g., greater diameter) than the front and back portions 276c, 276a, respectively.

In some instances, the conductive pin 275 can be press fitted into the aperture 370. For example, the center portion 276b can have an interference fit with a corresponding section of the aperture 370. Likewise, the back portion 276a also can have an interference fit with the corresponding section of the aperture 370. Accordingly, once press-fitted into the aperture 370, the conductive pin 275 can remain secured within the insulating body 330 during normal operation. In other words, the press fit can be sufficient to withstand the extreme localized pressures created by the blast wave. Additionally, to facilitate retention of the conductive pin 275 within the aperture 370, press-fitted portions of the conductive pin 275 can have roughened surfaces to provide increased friction between the conductive pin 275 and the aperture 370.

Also, to facilitate press fitting the conductive pin 275 into the aperture 370, the conductive pin 275 can have lead-in sections 410a, 410b, which can allow the conductive pin 275 (or portions thereof) to partially slide into the aperture 370. Subsequently, the conductive pin 275 can be press fitted, with the lead-in section 410a, 410b facilitating smooth entry of the conductive pin 275 into the aperture 370.

In one embodiment, the aperture 370 can have a shoulder 420 formed between the sections thereof that correspond with the back and center portions 276a, 276b of the conductive pin 275. The center portion 276b of the conductive pin 275 can bottom-out on the shoulder 420, thereby providing a predetermined position for the conductive pin 275 relative to the insulating body 330.

Furthermore, as noted above, the blast wave can travel in a direction oriented from the first isolation chamber 290 to the to the second isolation chamber 300. In other words, the blast wave can apply pressure onto the contactor tip 390 of the conductive pin 275, pressing the contactor tip 390 toward the back end 375b. The shoulder 420 can restrain the center portion 276b and, consequently, the conductive pin 275 from moving relative to the insulating body 330 (i.e., toward the back end 375b and/or out of the insulating body 330).

After firing the perforating gun assemblies, the perforating string can be withdrawn from the well, and the used pass-through bulkhead connection switches 270 can be removed from the respective isolation subassemblies. For subsequent firings, new pass-through bulkhead connection switches 270 can be used in the reassembled perforating gun assemblies. Materials from the used pass-through bulkhead connection switches 270 can be reclaimed and recycled and/or reused to manufacture new pass-through bulkhead connection switches 270.

For instance, the conductive pin 275 can be pressed out of the insulating body 330 and inserted into a new insulating body 330. Thus, the conductive pin 275 can be reused, and integrity of the insulation around the conducive pin 275 can be ensured by the new insulating body 330. Moreover, the insulating body 330 can be reground and used in molding, extruding, or otherwise making new insulating bodies 330 or stock material therefor. Consequently, recycling the used pass-through bulkhead connection switches 270 can reduce environmental impact of manufacturing and using the pass-through bulkhead connection switches 270 in perforating operations.

As described above, the pass-through bulkhead connection switch 270 can have O-rings 340 (specifically, O-rings 340a, 340b). The O-rings 340 can be located and secured within O-ring grooves 430 (i.e., within O-ring grooves 430a, 430b, respectively). In some embodiments, the grooves 430 can have a width that is greater than the cross-sectional size (e.g., outside diameter of the cross-section) of the O-rings 340. Hence, when the pass-through bulkhead connection switch 270 is pressed into the opening in the middle section 230 of the isolation subassembly, the O-rings 340 can be compressed along a first dimension and can have sufficient room in the O-ring groove 430 to expand along a second dimension. In other words, the O-rings 340 can be compressed to conform with the opening in the middle section of the isolation subassembly and can expand laterally in the O-ring groove 430. It should be appreciated that any single O-ring groove 430 can hold any number of O-rings 340.

In one or more embodiments, the O-rings 340 can be positioned proximal to the back end 375b of the insulating body 330. In other words, the O-ring grooves 430 can be positioned proximal to the portion of the aperture 370 with the smallest diameter, so as to maximize the material thickness between the O-ring grooves 430 and the aperture 370. This disclosure, however, is not so limited. Particularly, the O-rings 340 can be located anywhere along the insulating body 330 (e.g., near the front end 375).

Figure 5:
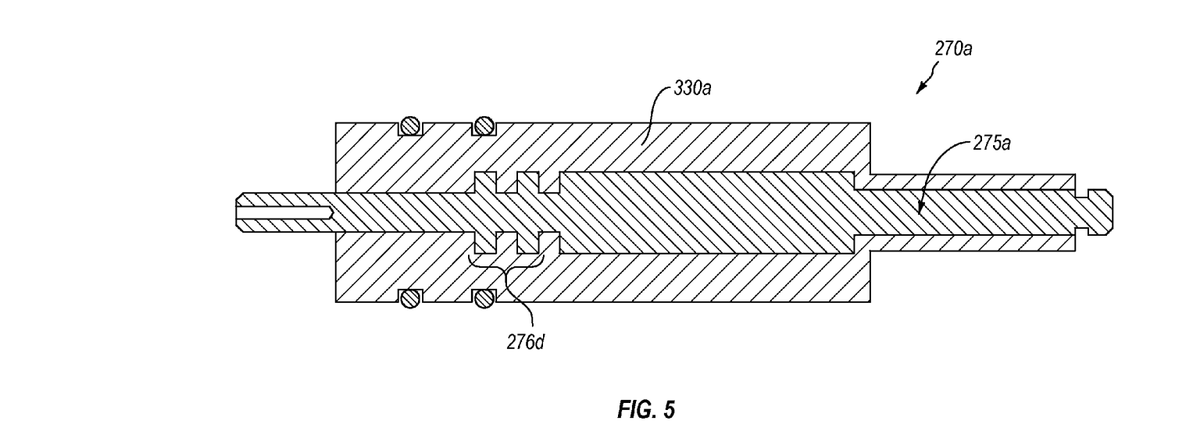
FIG. 5 illustrates a cross-sectional view of a pass-through bulkhead connection switch in accordance with another embodiment of the present invention.

Although the pass-through bulkhead connection switch 270 can have the conductive pin 275 that is press-fitted into the insulating body 330, it should be appreciated that this disclosure is not so limited. For example, FIG. 5 illustrates a pass-through bulkhead connection switch 270a that has a conductive pin 275a embedded or encapsulated in an insulating body 330a. Except as otherwise described herein, the pass-through bulkhead connection switch 270a can be substantially the same as the pass-through bulkhead connection switch 270 (FIGS. 4A-4B). For instance, the insulating body 330a can comprise a thermoplastic material, which can be molded (e.g., injection molded) over the conductive pin 275a. Furthermore, in some instances, the insulating body 330a also can be machined after molding to obtain closer tolerances.

In one or more embodiments, the conductive pin 275a can have a retention section 276d, which can aid in retaining the conductive pin 275a within the insulating body 330a, while the blast wave applies pressure to the conductive pin 275a. For instance, the retention section 276d can comprise alternating protrusions and recesses. When the insulating body 330a is overmolded about the conductive pin 275a, the thermoplastic material can fill the recesses that separate the protrusions of the retention section 276d, thereby securing the conductive pin 275a within the insulating body 330a. In any event, the conductive pin 275a can be secured within the insulating body 330a such that the conductive pin 275a can remain therein during and after the impact of the blast wave on the conductive pin 275a.

Furthermore, overmolded insulating body 330a can encapsulate the front portion of the conductive pin 275a. In other words, in lieu of or in addition to the insulating sleeve 410 (FIGS. 4A-4B), the front portion of the conductive pin 275a can be insulated by the insulating body 330 that encapsulates the front portion of the conductive pin 275a. In some embodiments, the contactor tip of the conductive pin 275a can remain un-encapsulated by insulating body 330a.

Figure 6:
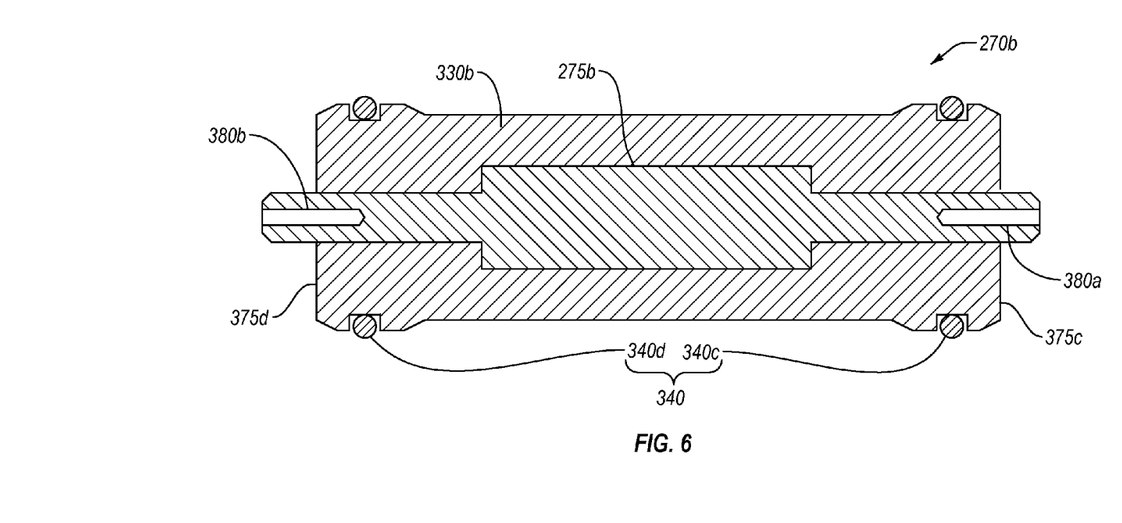
FIG. 6 illustrates a cross-sectional view of a pass-through bulkhead connection switch in accordance with yet another embodiment of the present invention.

As noted above, the O-rings 340 can be located anywhere on the insulating body of the pass-through bulkhead connection switch. For example, as illustrated in FIG. 6, a pass-through bulkhead connection switch 270b can include an insulating body 330b, which can have O-rings 340 (i.e., O-rings 340c, 340d) located on the opposite ends thereof. More specifically, the O-ring 340c can be located near a front end 375c of the insulating body 330b, and the O-ring 340d can be located near a back end 375d of the insulating body 330b.

Additionally, the pass-through connection switch 270b can include a conductive pin 275b at least partially embedded in the insulating body 330b. For instance, the conductive pin 275b can be overmolded or press-fit into insulating body 330b, as described above. Additionally, the conductive pin 275b can have a predetermined length (e.g., 2", 2.125", etc.) and can have a predetermined position relative to the insulating body 330b and to the front and back ends 375c, 375d thereof. Moreover, the insulating body 330b also can have a predetermined length (e.g., 1.5", 2", etc.). Accordingly, the opposing ends of the conductive pin 275b can be at a predetermined distance from the respective front and back ends 375c, 375d of the insulating body 330b.

As noted above, the conductive pin 270 can include an opening 380 (FIG. 4B) on an end thereof. It should be noted that this disclosure is not so limited. For instance, the conductive pin 275b can include two openings 380a, 380b, on opposing ends thereof, as shown in FIG. 6. Furthermore, the openings 380a, 380b can be configured to accept banana clip or similar connectors therein. For example, the connectors accepted within the openings 380a, 380b can have one or more springs that can press against the surface of the opening, thereby frictionally retaining the connector within the opening.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A pass-through bulkhead connection switch for use in connection with a well perforation system, the well perforation system including a detonation controller located at ground level and a perforating gun assembly configured to be positioned in a well and utilized for perforating a well casing, the perforating gun assembly including an isolation subassembly having a detonation mechanism, the pass-through bulkhead connection switch being configured to provide a reliable connection for transmitting a detonation signal from the detonation controller to the detonation mechanism, the pass-through bulkhead connection switch comprising:

an insulating body comprising an electrically insulating material, the insulating body being sized and configured to be secured within an opening of the isolation subassembly of the perforating gun assembly, the insulating body having at least one O-ring grove in an outer surface thereof, and the insulating body having an aperture passing therethrough, the aperture having a first internal diameter in a first portion thereof, a second internal diameter in a second portion thereof, and a shoulder formed between the first internal diameter and the second internal diameter; and a conductive pin having a front portion, a back portion, a center portion, and a transition shoulder between the back portion and the center portion, the center portion having a cross-sectional dimension that is different than one or more of the front portion and the back portion, at least a portion of the back portion having an outer diameter that generally corresponds to the first internal diameter of the aperture, at least a portion of the center portion having an outer diameter that generally corresponds to the second internal diameter of the aperture, the transition shoulder of the aperture and the shoulder of the conductive pin being configured to create a seal between the conductive pin and the insulating body and to limit axial movement of the conductive pin relative to the insulating body, the center portion of the conductive pin being secured within the aperture of the insulating body, the conductive pin being configured to transmit the detonation signal to the perforating gun assembly located in the well.

2. The pass-through bulkhead connection switch as recited in claim 1, wherein the insulating material is configured to insulate the center portion of the conductive pin at operating pressures of up to 30,000 psi.

3. The pass-through bulkhead connection switch as recited in claim 2, wherein the insulating material is configured to insulate the center portion of the conductive pin at operating temperatures of up to 480° F.

4. The pass-through bulkhead connection switch as recited in claim 1, wherein the conductive pin is press-fitted into the aperture in the insulating body.

5. The pass-through bulkhead connection switch as recited in claim 1, wherein the insulating body is overmolded about the conductive pin.

6. The pass-through bulkhead connection switch as recited in claim 5, wherein the insulating body encapsulates the front portion of the conductive pin.

7. The pass-through bulkhead connection switch as recited in claim 1, further comprising an electrically insulating sleeve fitted over the front portion of the conductive pin, the electrically insulating sleeve being configured to electrically insulate the front portion of the conductive pin.

8. The pass-through bulkhead connection switch as recited in claim 1, further comprising a contactor tip located on a proximal end of the conductive pin, the contactor tip being separated from the front portion of the conductive pin by a groove.

9. The pass-through bulkhead connection switch as recited in claim 1, wherein shoulder in the insulating body is an angled shoulder.

10. The pass-through bulkhead connection switch as recited in claim 1, wherein the shoulder in the insulating body forms a right angle with the first and second portions of the aperture.

11. A system for making perforations in a well casing at multiple depth locations in a sequential or non-sequential manner, the perforations being configured to access one or more of oil and gas deposits disposed within a rock layer below ground and to channel the same into the well, the system comprising:

a first perforating gun assembly comprising a first plurality of charges and a first detonation mechanism configured to detonate the first plurality of charges; and a second perforating gun assembly comprising a second plurality of charges, an isolation subassembly, and a second detonation mechanism located in the isolation subassembly, the second detonation mechanism being configured to detonate the second plurality of charges; and a pass-through bulkhead connection switch in electrical communication with the first detonation mechanism and with the second detonation mechanism, the pass-through bulkhead connection switch including an uninterrupted electrically conductive pin and an electrically insulating body at least partially surrounding and electrically insulating the conductive pin, the pass-through bulkhead switch being configured to communicate a detonation signal to the first detonation mechanism and to prevent or reduce increase of pressure about the second detonation mechanism from a blast wave formed after the detonation of the first plurality of charges, wherein:

the conductive pin comprises a front portion, a back portion, a center portion, and a transition shoulder between the back portion and the center portion, at least a portion of the back portion having a first outer diameter, at least a portion of the center portion having a second outer diameter that is different from the first outer diameter; and the insulating body comprises an aperture passing therethrough, the aperture having a first internal diameter in a first portion thereof, the first internal diameter generally corresponding to the first outer diameter of the back portion, a second internal diameter in a second portion thereof, the second internal diameter generally corresponding to the second outer diameter of the center portion, and a shoulder formed between the first internal diameter and the second internal diameter, the shoulder in the aperture and the transition shoulder of the conductive pin being configured to cooperate to create a seal between the conductive pin and the insulating body and to limit axial movement of the conductive pin relative to the insulating body.

12. The system as recited in claim 11, wherein the isolation subassembly comprises a first isolation chamber and a second isolation chamber, the second isolation chamber housing the second detonation mechanism, and the second isolation chamber being isolated from the first isolation chamber by the pass-through bulkhead connection switch.

13. The system as recited in claim 12, wherein the pass-through bulkhead connection switch is at least partially secured within the isolation subassembly by an at least partially insulated retention nut.

14. The system as recited in claim 12, wherein the pass-through bulkhead connection switch comprises insulating material configured to maintain isolation of the second isolation chamber at operating pressures of up to 30,000 psi.

15. The system as recited in claim 12, wherein the pass-through bulkhead connection switch comprises insulating material configured to maintain isolation of the second isolation chamber at operating temperatures of up to 480° F.

16. The system as recited in claim 11, wherein the pass-through bulkhead connection switch comprises a conductive pin secured within an insulating body.

17. The system as recited in claim 16, wherein the conductive pin transmits the detonation signal from the second perforating gun assembly to the first perforating gun assembly.

18. A method of reliably sequentially transmitting detonation signals to detonation mechanisms of multiple perforating gun assemblies and detonating explosive charges housed in the perforating gun assemblies, the method comprising:

isolating a first detonation mechanism in a first isolation chamber of a first perforating gun assembly by sealing the first isolation chamber with a pass-through bulkhead connection switch that includes an uninterrupted electrically conductive pin and an electrically insulating body at least partially surrounding and electrically insulating the conductive pin, the conductive pin comprising a front portion, a back portion having a first outer diameter, a center portion having a second outer diameter, and a transition shoulder between the back portion and the center portion, the insulating body comprising an aperture passing therethrough that has a first internal diameter in a first portion thereof, a second internal diameter in a second portion thereof, and a shoulder formed between the first internal diameter and the second internal diameter, the first internal diameter generally corresponding to the first outer diameter of the back portion and the second internal diameter generally corresponding to the second outer diameter of the center portion, the shoulder in the aperture and the transition shoulder of the conductive pin being configured to cooperate to create a seal between the conductive pin and the insulating body and to limit axial movement of the conductive pin relative to the insulating body during a detonation, the first detonation mechanism being in electrical communication with the pass-through bulkhead connection switch, and the pass-through bulkhead connection switch being in electrical communication with a second detonation mechanism; and detonating a second plurality of charges located in a second perforating gun assembly by sending a detonation signal through the pass-through bulkhead connection switch to the second detonation mechanism, wherein the pass-through bulkhead connection switch is configured to at least partially block a blast wave generated by the detonation of the second plurality of charges.

19. The method of as recited in claim 18, wherein the pass-through bulkhead connection switch is configured to at least partially block the blast wave that creates a localized pressure about the pass-through bulkhead connection switch of up to 30,000 psi.

20. The method as recited in claim 18, further comprising detonating a first plurality of charges located in the first perforating gun assembly.

21. The method as recited in claim 20, wherein the first plurality of charges is detonated after detonating the second plurality of charges.

22. The method as recited in claim 18, further comprising at least partially insulating the detonation signal passing through the pass-through bulkhead connection switch.

* * * * *